United States Patent
Tsirkin

(10) Patent No.: US 9,268,583 B2
(45) Date of Patent: Feb. 23, 2016

(54) MIGRATION OF VIRTUAL MACHINES WITH SHARED MEMORY

(71) Applicant: Red Hat Israel,Ltd., Ra'anana (IL)

(72) Inventor: Michael Tsirkin, Ra'anana (IL)

(73) Assignee: Red Hat Israel, Ltd., Ra'anana (IL)

( * ) Notice: Subject to any disclaimer, the term of this patent is extended or adjusted under 35 U.S.C. 154(b) by 255 days.

(21) Appl. No.: 13/776,417

(22) Filed: Feb. 25, 2013

(65) Prior Publication Data

US 2014/0245293 A1  Aug. 28, 2014

(51) Int. Cl.
G06F 9/455 (2006.01)
G06F 9/50 (2006.01)

(52) U.S. Cl.
CPC ............ *G06F 9/455* (2013.01); *G06F 9/45558* (2013.01); *G06F 9/5088* (2013.01); *G06F 2009/4557* (2013.01)

(58) Field of Classification Search
CPC ... G06F 9/455; G06F 9/45558; G06F 9/5088; G06F 2009/4557
See application file for complete search history.

(56) References Cited

U.S. PATENT DOCUMENTS

| | | | |
|---|---|---|---|
| 7,203,944 B1 * | 4/2007 | van Rietschote et al. ..... 718/104 |
| 7,257,811 B2 * | 8/2007 | Hunt et al. ........................ 718/1 |
| 7,716,667 B2 * | 5/2010 | van Rietschote et al. ......... 718/1 |
| 7,900,005 B2 * | 3/2011 | Kotsovinos et al. .......... 711/162 |
| 8,244,957 B2 * | 8/2012 | Eidus et al. ........................ 711/6 |
| 8,327,060 B2 * | 12/2012 | Heim ................................. 711/6 |
| 8,352,938 B2 | 1/2013 | Hunt et al. |
| 8,356,120 B2 * | 1/2013 | Tsirkin et al. .................... 710/15 |
| 8,397,232 B2 * | 3/2013 | Iwamatsu et al. ................. 718/1 |
| 8,589,921 B2 * | 11/2013 | Heim ................................. 718/1 |
| 8,694,644 B2 * | 4/2014 | Chen et al. .................... 709/226 |
| 8,745,234 B2 * | 6/2014 | Liu et al. ....................... 709/226 |
| 8,819,678 B2 * | 8/2014 | Tsirkin ............................. 718/1 |
| 8,826,292 B2 * | 9/2014 | Heim ........................... 718/105 |
| 8,832,683 B2 * | 9/2014 | Heim ................................. 718/1 |
| 2005/0268298 A1 * | 12/2005 | Hunt et al. ........................ 718/1 |
| 2012/0030335 A1 * | 2/2012 | Machida ....................... 709/223 |
| 2012/0137292 A1 * | 5/2012 | Iwamatsu et al. ................. 718/1 |
| 2012/0265882 A1 * | 10/2012 | Hatasaki et al. .............. 709/226 |
| 2014/0019964 A1 * | 1/2014 | Neuse et al. ....................... 718/1 |
| 2014/0201302 A1 * | 7/2014 | Dube et al. .................... 709/212 |

* cited by examiner

*Primary Examiner* — Van Nguyen
(74) *Attorney, Agent, or Firm* — Haynes and Boone, LLP

(57) ABSTRACT

A system and method of migration of a VM sharing a memory region with another VM includes identifying, by an identification module, a plurality of VMs running on a source host machine, where the plurality of VMs includes first and second VMs that share a first shared memory region coupled to the source host machine; identifying, by a target module, a host machine as a target for the second VM; allocating, by an allocation module, a second shared memory region coupled to the target host machine for the second VM; stopping, by a migration module, execution of the second VM on the source host machine; and migrating, by the migration module, the second VM to the target host machine.

20 Claims, 6 Drawing Sheets

MIGRATION OF VIRTUAL MACHINES WITH SHARED MEMORY

BACKGROUND

The present disclosure generally relates to a computing system, and more particularly to migration of virtual machines.

A virtual machine is a portion of software that, when executed on appropriate hardware, creates an environment allowing the virtualization of certain functionality of a physical computer system. A virtual machine may function as a self-contained platform, running its own operating system (OS) and software applications (processes).

A host machine (e.g., computer or server) is typically enabled to simultaneously run one or more virtual machines, where each virtual machine may be used by a local or remote client. The host machine allocates a certain amount of the host's resources to each of the virtual machines. Each virtual machine may use the allocated resources to execute applications, including operating systems known as guest operating systems. A hypervisor virtualizes the underlying hardware of the host machine or emulates hardware devices, making the use of the virtual machine transparent to the guest operating system or the remote client that uses the virtual machine. Typically, the hypervisor manages allocation and virtualization of computer resources and performs context switching, as may be necessary, to cycle between various virtual machines.

In a virtual environment, a virtual machine running on a host machine may be migrated. Various considerations may be taken into account before the virtual machine is migrated. For example, if a virtual machine shares memory with another virtual machine running on the host machine, this may cause complications in the migration.

BRIEF SUMMARY

This disclosure relates to migration of a virtual machine sharing a memory region with another virtual machine. Methods, systems, and techniques for migration of a virtual machine that shares a memory region with another virtual machine are provided.

According to an embodiment, a system for migration of a virtual machine sharing a memory region with another virtual machine includes an identification module that identifies a plurality of virtual machines running on a source host machine. The plurality of virtual machines includes a first virtual machine and a second virtual machine that share a first shared memory region coupled to the source host machine. The system also includes a target module that identifies a host machine as a target for the second virtual machine. The system further includes an allocation module that allocates a second shared memory region coupled to the target host machine for the second virtual machine. The system also includes a migration module that stops execution of the second virtual machine on the source host machine and migrates the second virtual machine to the target host machine. A time period in which the first virtual machine is running on the source host machine overlaps with a time period in which the second virtual machine is running on the target host machine.

According to another embodiment, a method of migration of a virtual machine sharing a memory region with another virtual machine includes identifying a plurality of virtual machines running on a source host machine. The plurality of virtual machines includes a first virtual machine and a second virtual machine that share a first shared memory region coupled to the source host machine. The method also includes identifying a host machine as a target for the second virtual machine. The method further includes allocating a second shared memory region coupled to the target host machine for the second virtual machine. The method also includes stopping execution of the second virtual machine on the source host machine. The method further includes migrating the second virtual machine to the target host machine, a time period in which the first virtual machine is running on the source host machine overlapping with a time period in which the second virtual machine is running on the target host machine.

According to another embodiment, a non-transitory machine-readable medium includes a plurality of machine-readable instructions that when executed by one or more processors are adapted to cause the one or more processors to perform a method including identifying a plurality of virtual machines running on a source host machine, the plurality of virtual machines including a first virtual machine and a second virtual machine that share a first shared memory region coupled to the source host machine; identifying a host machine as a target for the second virtual machine; allocating a second shared memory region coupled to the target host machine for the second virtual machine; stopping execution of the second virtual machine on the source host machine; and migrating the second virtual machine to the target host machine. A time period in which the first virtual machine is running on the source host machine overlaps with a time period in which the second virtual machine is running on the target host machine.

BRIEF DESCRIPTION OF THE DRAWINGS

The accompanying drawings, which form a part of the specification, illustrate embodiments of the invention and together with the description, further serve to explain the principles of the embodiments. In the drawings, like reference numbers may indicate identical or functionally similar elements. The drawing in which an element first appears is generally indicated by the left-most digit in the corresponding reference number.

DETAILED DESCRIPTION

Figure 1:
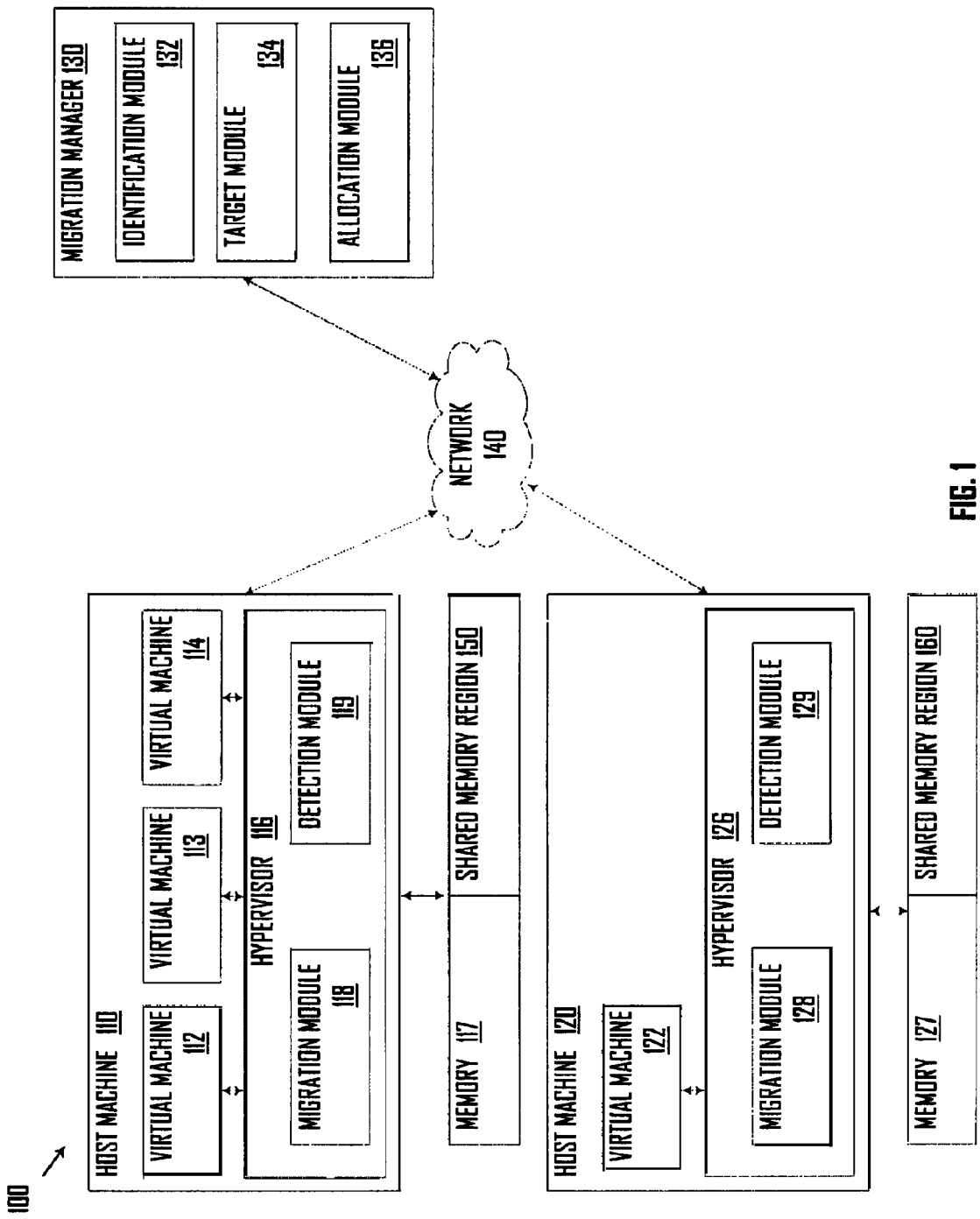
FIG. 1 is a simplified block diagram illustrating a system for separate migration of a virtual machine sharing a memory region with another virtual machine, according to an embodiment.

I. Overview
II. Example System Architecture
   A. Host Machines
   B. VM Migration
   C. Detecting an Access to Shared Memory
      1. Attempted Access to Shared Memory By VM Running on Source Host Machine
      2. Attempted Access to Shared Memory By VM Running on Target Host Machine
      3. Determine Whether Memory Pages are Present in Shared Memory
III. Another Example System Architecture
IV. Example Method
V. Example Computing System

I. Overview

It is to be understood that the following disclosure provides many different embodiments, or examples, for implementing different features of the present disclosure. Some embodiments may be practiced without some or all of these specific details. Specific examples of components, modules, and arrangements are described below to simplify the present disclosure. These are, of course, merely examples and are not intended to be limiting.

A virtual machine (VM) running on a source host machine may be migrated to a target host machine. A source host machine may refer to a host machine running a VM that is migrated. A target host machine may refer to the host machine to which the VM running on the source host machine migrates. A plurality of VMs may run on the same host machine, and a subset of the plurality of VMs may share a memory region. One or more VMs of the subset may be separately migrated to the target host machine.

In an example, a first application running on a first VM and a second application running on a second VM may communicate with each other using a shared memory region that is shared between the first and second VMs. For instance, the first application may communicate to the second application by writing to a portion of the shared memory region, and the second application may read from that portion of memory. When VMs share a shared memory region, the proportion of the host machine's total computer resources may be increased because less memory may be used to store data associated with the VMs.

A VM running on a host machine may be migrated to another host machine or a logical partition within the same host machine. Various considerations may be considered before the VM is migrated. For example, if the VM shares memory with another VM, this may cause complications in the migration.

For instance, VMs that share a shared memory region may need to be migrated concurrently because inconsistencies may result if a VM modifies a shared memory region and the modification is not visible to another VM running on a different machine. Additionally, when performing live migration, several gigabytes of random access memory (RAM) are typically moved from the source host machine to the target host machine. Accordingly, concurrent migration of multiple VMs may cause problems when network resources are a constraint. Further, trying to migrate between different sites that have low bandwidth or high latency may be time consuming. Accordingly, it may be beneficial to optimize this migration process.

This disclosure provides a technique to optimize the migration of VMs based on memory sharing to, for example, handle situations when the network or other resources of the virtualization system are constrained.

II. Example System Architecture

FIG. 1 is a simplified block diagram 100 illustrating a system for separate migration of a VM sharing a memory region with another VM, according to an embodiment.

Diagram 100 includes a host machine 110, host machine 120, and migration manager 130 coupled to a network 140. Each of host machine 110, host machine 120, and migration manager 130 may communicate with each other via network 140.

Network 140 may include various configurations and use various protocols including the Internet, World Wide Web, intranets, virtual private networks, wide area networks, local networks, private networks using communication protocols proprietary to one or more companies, cellular and other wireless networks, Internet relay chat channels (IRC), instant messaging, simple mail transfer protocols (SMTP), Ethernet, WiFi and HTTP, and various combinations of the foregoing.

A. Host Machines

A host machine may run one or more VMs that run applications and services. A VM running on a host machine may run a guest operating system (OS) that may be different from another guest OS system running on the host machine and may also be different from the host OS running on the host machine. The host or guest OS may include, for example, MICROSOFT® WINDOWS®, LINUX®, SOLARIS®, and MAC® OS. Trademarks are the property of their respective owners. One or more applications may run on each guest operating system (not shown).

Host machine 110 includes a VM 112, VM 113, and VM 114, and a hypervisor 116. Host machine 110 is coupled to a memory 117. Memory 117 may be RAM or disk. Memory may be divided between the VMs running on host machine 110 as virtual memory based on allocations of virtual memory address ranges. One or more address translation tables may be used to translate the virtual addresses used by the VMs running on host machine 110 to real memory addresses where the actual data is stored. Hypervisor 116 may provide the VMs running host machine 110 with access to hardware devices to perform input/output (I/O). For example, hypervisor 116 may provide VM 112, VM 113, and VM 114 access to one or more processors (not shown), memory 117, and/or other hardware devices.

Further, each of the VMs running on host machine 110 may have access to a private memory region. In an example, VM 112 may have access to a private memory region, VM 113 may have access to a private memory region, and VM 114 may have access to a private memory region. Accordingly, VM 112 may be unable to access the private memory regions of VMs 113 and 114, VM 113 may be unable to access the private memory regions of VMs 112 and 114, and VM 114 may be unable to access the private memory regions of VMs 112 and 113.

Similarly, host machine 120 includes a VM 122 and a hypervisor 126. Host machine 120 is coupled to a memory 127. Memory 127 may be RAM or disk. Memory may be divided between the VMs running on host machine 120 as virtual memory based on allocations of virtual memory address ranges. One or more address translation tables may be used to translate the virtual addresses used by the VMs running on host machine 120 to real memory addresses where the actual data is stored. Hypervisor 126 may provide the VMs running host machine 120 with access to hardware devices to perform input/output (I/O). For example, hypervisor 126 may provide VM 122 access to one or more processors (not shown), memory 127, and/or other hardware devices. Further, each of the VMs running on host machine 120 may have access to a private memory region. In an example, VM 122 may have access to a private memory region.

VMs may run an OS and processes with the same memory image as other VMs. In such a case, a host process may be used to optimize memory usage on the host, by referencing identical memory pages from multiple VMs to the same single memory page. This may be known as memory sharing. Memory sharing may reduce the amount of memory required in the host when running VMs with shared memory.

One or more VMs running on host machine 110 may share a shared memory region with another VM running on host machine 110. In an example, VMs 112 and 113 may share a shared memory region 150. Accordingly, VMs 112 and 113 may be able to access shared memory region 150, and VM 114 may be unable to access shared memory region 150. Other VMs sharing a shared memory region are also possible. For example, VM 113 and VM 114 may share a shared memory region different from shared memory region 150. Further, one or more VMs running on host machine 120 may share a shared memory region 160.

B. VM Migration

Hypervisor 116, 126 includes a migration module 118, 128. Migration modules 118 and 128 may migrate a VM from the source host machine to the target host machine. Migration module 118 may control one or more VMs running on host machine 110, and migration module 128 may control one or more VMs running on host machine 120. In an example, migration module 118 may stop execution or resume execution of VM 112, VM 113, or VM 114. Similarly, migration module 128 may stop execution or resume execution of VM 122. Further, if VM 112 is migrated to host machine 120, migration module 128 may stop execution or resume execution of VM 112.

Migration modules 118 and 128 may also communicate with each other to migrate one or more VMs from the source host machine to the target host machine. In an example, migration of a VM from the source host machine to the target host machine may include stopping execution of the VM on the source host machine, copying at least a portion of the state of the VM from the source host machine to the target host machine, resuming execution of the VM on the target host machine, and enabling the VM to access the state on the target host machine.

In an embodiment, a portion of the state of the VM may be migrated while it is still running. After, for example, a threshold amount of content has been migrated, execution of the VM may be stopped, and the VM may be migrated to the target host machine. An example of the VM state that may be transferred to the target host machine may be a memory of the VM. Further, after the VM stops, registers of the CPU in the source host machine or configuration information in the source host machine of the virtual devices assigned to the VM may be transferred to the target host machine.

A VM may be migrated for a variety of reasons. In an example, the hypervisor in the source host machine knows that the hypervisor is about to crash and migrates the VM to the target host machine. In this way, the VM may remain active after the hypervisor on the source host machine crashes. In another example, a user wishing to update or service the hypervisor in the source host machine may notify the guest operating system running in the VM on the source host machine. For instance, the user may wish to restart or reboot the source host machine. In response to the notification, the guest operating system may request that the hypervisor in the source host machine initiate migration of the VM to the target host machine. In another example, the source host machine may be resource constrained and the VM may be migrated to the target host machine for load balancing purposes. For instance, the hypervisor administrator may be aware that the source host machine is resource constrained and desires to reduce the load on the source host machine. The hypervisor administrator may be, for example, a software module or a human being.

Migration manager 130 may perform actions to assist in migrating one or more VMs from the source host machine to the target host machine. In an embodiment, migration manager 130 is an external application that has access to host machines 110 and 120.

Figure 4:
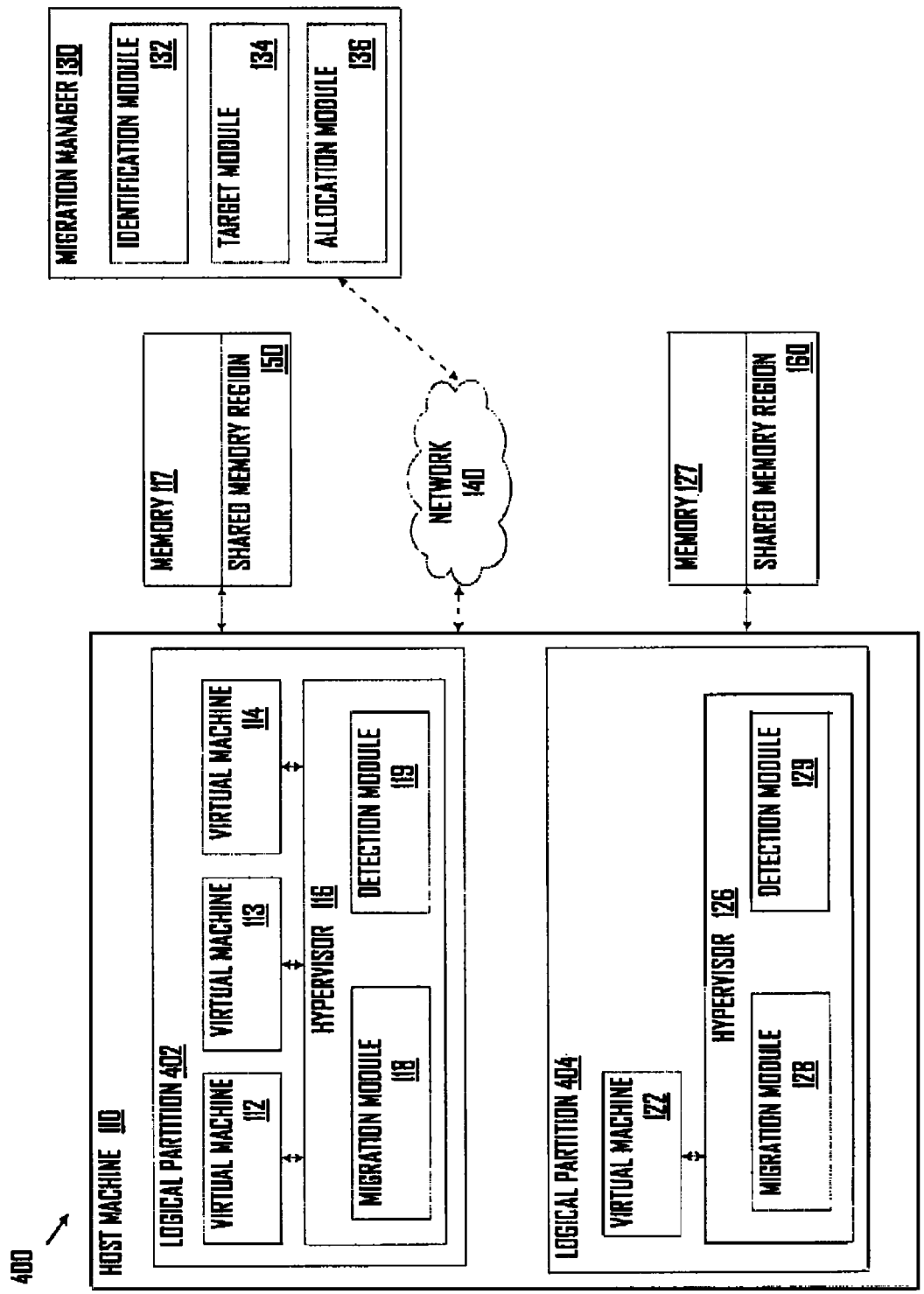
FIG. 4 is a simplified block diagram illustrating another system for migration of a virtual machine sharing a memory region with another virtual machine, according to an embodiment.

For simplicity, the following is a description of the migration of a VM from the source host machine to a different host machine. This description applies as well to migration of the VM from a logical partition in the source host machine to another logical partition in the source host machine (as shown in FIG. 4).

Migration manager 130 includes an identification module 132, target module 134, and allocation module 136. In an embodiment, identification module 130 identifies a plurality of VMs running on a source host machine. The plurality of VMs may include a first VM and a second VM that share a shared memory region coupled to the host machine. In an example, VM 112 and VM 113 may share shared memory region 150 in memory 117. Accordingly, VM 112 and VM 113 may access shared memory region 150, and VM 114 may be unable to access shared memory region 150.

In an embodiment, target module 134 identifies a host machine as a target for migration of a VM of the plurality of VMs. A host machine may be identified as the target host machine for various reasons. In an example, the source host machine is resource constrained and the target host machine has a lot of available resources to run the VM. Further, a VM of the plurality of VMs may be selected to be migrated before one or more VMs of the plurality of VMs for various reasons. In an example, the selected VM has more content to copy and send to the target host machine than other VMs of the plurality of VMs. In another example, the selected VM is the oldest VM of the plurality of VMs created by the hypervisor in the source host machine. Target module 134 may select VM 113 to be migrated and identify host machine 120 as the target host machine in which to migrate VM 113.

In an embodiment, allocation module 136 allocates a memory region coupled to the target host machine for the selected VM to be migrated. VM 113 may have access to a memory region that is coupled to the source host machine and allocated to VM 113. The memory region may be a virtual memory region that is mapped to a location in memory 117. Migrating VM 113 to host machine 120 may include copying content from the memory region coupled to host machine 110 to a memory region that is coupled to host machine 120 and allocated to VM 113 by allocation module 136. In an embodiment, a size of the memory region coupled to the source host machine is the same as a size of the second memory region allocated by allocation module 136 and coupled to the target host machine. In another embodiment, a size of the memory region coupled to the source host machine is different from a size of the second memory region allocated by allocation module 136 and coupled to the target host machine. The content may include state information of VM 113.

In an example, the memory region that is coupled to the source host machine and allocated to VM 113 is a private memory region. For instance, VM 113 has access to a first private memory region coupled to host machine 110, and VMs 112 and 114 are unable to access the first private memory region. Allocation module 136 may allocate for VM 113 a second private memory region coupled to host machine 120. Migration modules 118 and 128 may copy content from the first private memory region to the second private memory region. In an example, migration module 118 may retrieve the content from the first private memory region and send the copy of the content to host machine 120. Migration module 128 may receive the content and store it in the second private memory region. Migration module 128 may enable VM 113 to access the second private memory region and resume execution of VM 113 on host machine 120.

In another example, the memory region that is coupled to the source host machine and allocated to VM 113 is a shared memory region. For instance, VM 113 has access to shared memory region 150 coupled to host machine 110. Shared memory region 150 may be shared by VM 112 and VM 113. Allocation module 136 may allocate for VM 113 a shared memory region 160 coupled to host machine 120. Migration modules 118 and 128 may copy content from shared memory region 150 to shared memory region 160. In an example, migration module 118 may retrieve the content from shared memory region 150 and send the copy of the content to host machine 120. Migration module 128 may receive the content and store it in shared memory region 160. Migration module 128 may enable VM 113 to access shared memory region 160 and resume execution of VM 113 on host machine 120.

In an embodiment, even though VMs 112 and 113 share a shared memory region coupled to the source host machine, a time period in which VM 112 is running on the source host machine overlaps with a time period in which VM 113 is running on the target host machine. In an example, a time period in which migration module 118 initiates migration of VM 112 running on host machine 110 to host machine 120 overlaps with a time period in which VM 113 is running on host machine 120.

In an embodiment, even though VMs 112 and 113 share a shared memory region coupled to the source host machine, VM 113 may be migrated from the source host machine to the target host machine before VM 112 is migrated from the source host machine to the target host machine before. VM 112 may be migrated to the target host machine at a later point in time. In an example, migration module 118 stops execution of VM 113 on host machine 110 and migrates VM 113 to host machine 120, where migration module 118 migrates VM 113 to host machine 120 before migration module 118 migrates VM 112 to host machine 120. This may include migration module 118 sending at least a portion of state information of VM 113 to the target host machine. Additionally, at a later point in time, migration module 118 may stop execution of VM 112 on host machine 110 and migrate VM 112 to host machine 120. Migration module 128 may enable VM 112 to access shared memory region 160 and resume execution of VM 112 on host machine 120.

C. Detecting an Access to Shared Memory

A time period in which VM 112 is running on host machine 110 may overlap with a time period in which VM 113 is running on host machine 120. During this time period, it may be undesirable to allow VM 112 running on host machine 110 to modify shared memory region 150 because VM 113 running on host machine 120 may be unaware of the modifications, resulting in consistencies or an unstable state. Similarly, it may also be undesirable to allow VM 113 running on host machine 120 to modify shared memory region 160 because VM 112 running on host machine 110 may be unaware of the modifications, resulting in consistencies or an unstable state.

It may be desirable to detect when VM 112 or VM 113 is attempting to access the shared memory regions when VM 112 and VM 113 are running on different host machines (or logical partitions of the same host machine).

1. Attempted Access to Shared Memory by VM Running on Source Host Machine

In an embodiment, hypervisor 116 includes a detection module 119 that detects an attempted access to a memory region by a VM running on host machine 110.

Figure 2:
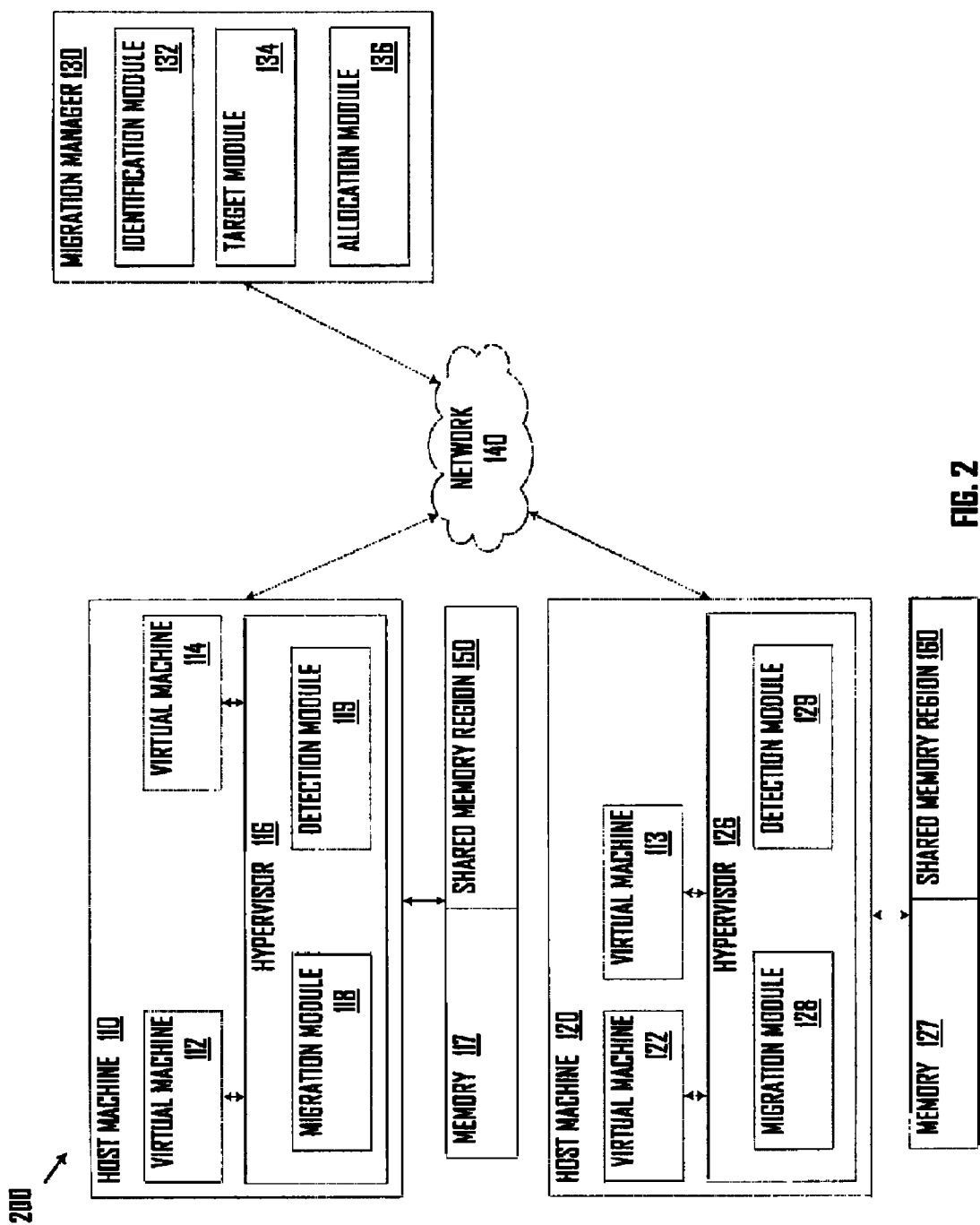
FIG. 2 is a simplified block diagram illustrating a system after separate migration of a virtual machine that shares a memory region with another virtual machine, according to an embodiment.

FIG. 2 is a simplified block diagram 200 illustrating a system after separate migration of VM 113, which shares shared memory region 150 with VM 112, to host machine 120, according to an embodiment. In FIG. 2, VM 113 is present in host machine 120.

Migration module 128 may enable VM 113 to access shared memory region 160 and resume execution of VM 113 on host machine 120, where a time period in which VM 112 is running on host machine 110 overlaps with a time period in which VM 113 is running on host machine 120. In an example, after VM 113 has been migrated to host machine 120, detection module 119 detects an attempted access to shared memory region 150 by VM 112 running on host machine 110. Migration module 118 may, in response to the detection, stop execution of VM 112 on host machine 110 and trap the attempted access.

Hypervisor 116 may desire to wait until VM 112 is migrated to host machine 120 before resuming execution of VM 112. Migration modules 118 and 128 may migrate VM 112 to host machine 120. In this way, migration module 118 may prevent VM 112 from modifying shared memory region 150 without VM 113 being aware of the modification. Migrating VM 112 to host machine 120 may include sending the trapped access to host machine 120 for execution on host machine 120 and copying content from shared memory region 150 to shared memory region 160.

Migration module 128 may receive the trapped access for execution on host machine 120, resume execution of VM 112 on host machine 120, and enable VM 112 to access shared memory region 160. The trapped access may be executed on host machine 120 using shared memory region 160. In this way, both VM 112 and VM 113 may be running on the same host machine (or logical partition) when memory shared by VM 112 and VM 113 is modified.

Additionally, in response to detection module 119 detecting an attempted access to shared memory region 150 by VM 112 running on host machine 110, migration module 118 or migration manager 130 may send a communication to host machine 120 that causes host machine 120 to stop execution of VM 113 on host machine 120. When both VM 112 and VM 113 have been migrated to host machine 120, migration module 128 may resume execution of VM 112 and VM 113. In an example, in response to VM 112 resuming execution on host machine 120, migration module 128 may resume execution of VM 113 on host machine 120. In another example, in response to VM 113 resuming execution on host machine 120, migration module 128 may resume execution of VM 112 on host machine 120.

Figure 3:
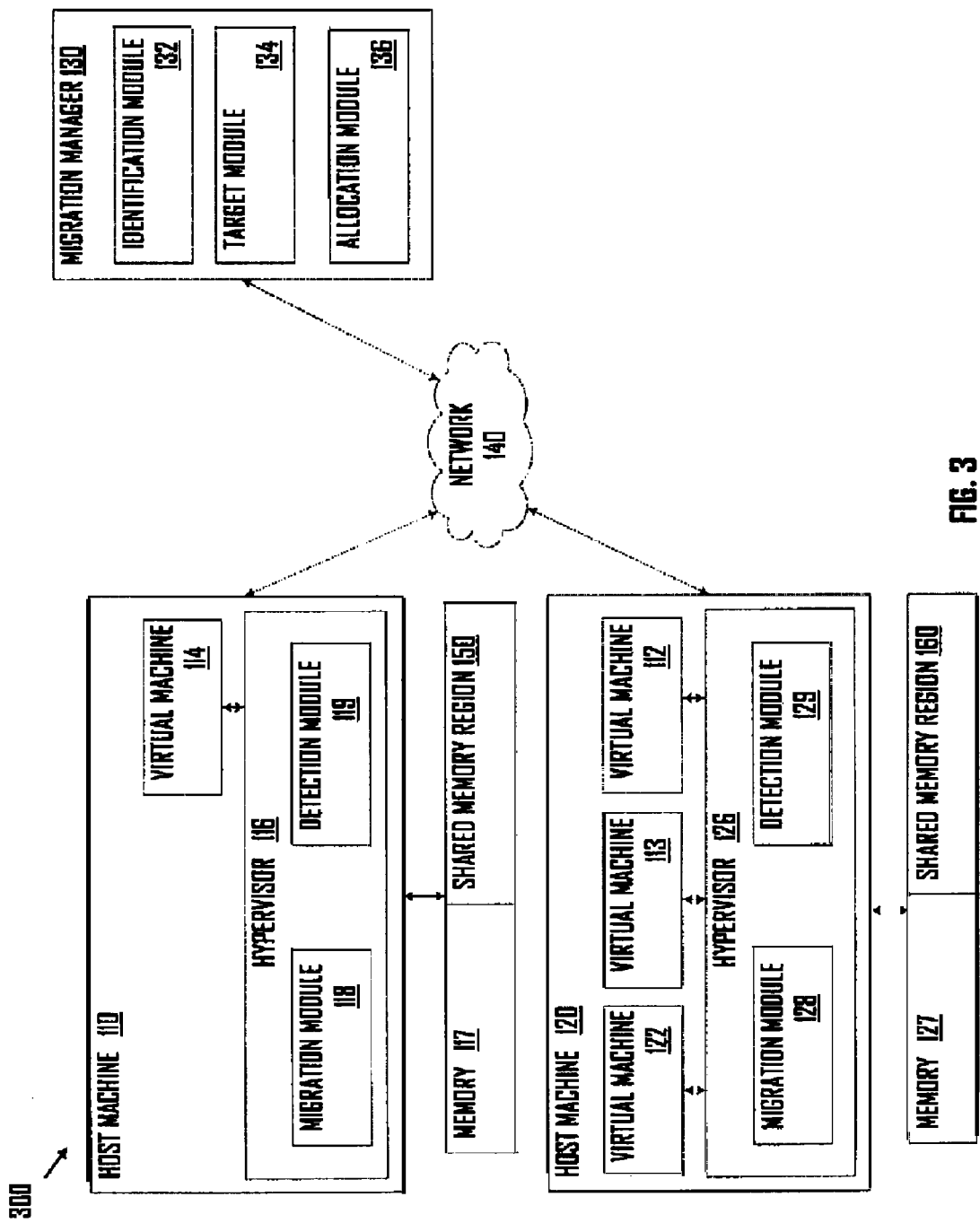
FIG. 3 is a simplified block diagram illustrating a system after migration of virtual machines that share a memory region, according to an embodiment.

FIG. 3 is a simplified block diagram 300 illustrating a system after migration of VMs 112 and 113 to host machine 120, according to an embodiment. In FIG. 3, VM 112 and VM 113 are present in host machine 120.

2. Attempted Access to Shared Memory by VM Running on Target Host Machine

In an embodiment, hypervisor 126 includes a detection module 129 that detects an attempted access to a memory region by a VM running on host machine 120.

Referring back to FIG. 2, VM 112 is present in host machine 110, and VM 113 is present in host machine 120. After VM 113 has been migrated to host machine 120, migration module 128 may resume execution of VM 113 on host machine 120 and enable VM 113 to access shared memory region 160 coupled to host machine 120. In an example, a time period in which VM 112 is running on host machine 110 overlaps with a time period in which VM 113 is running on host machine 120. During this time period, detection module 129 may detect an attempted access to shared memory region 160 by VM 113 running on host machine 120. In another example, after VM 113 has been migrated to host machine 120 and before VM 112 has been migrated to host machine 120, detection module 129 may detect an attempted access to shared memory region 160 by VM 113 running on host machine 120. Migration module 128 may, in response to the detection, stop execution of VM 113 on host machine 120 and trap the attempted access. In this way, migration module 128 may prevent VM 113 from modifying shared memory region 160.

Hypervisor 126 may desire to wait until VM 112 is migrated to host machine 120 before resuming execution of VM 113. To migrate VM 112 to host machine 120, migration module 118 may stop execution of VM 112 on host machine 110 and migrate VM 112 to host machine 110. Migration module 128 may, in response to VM 112 migrating to host machine 120, resume execution of VM 113 on host machine 110. In this way, both VM 112 and VM 113 may be running on the same host machine (or logical partition) when memory shared by VM 112 and VM 113 is modified. The trapped access may then be executed on host machine 120 using shared memory region 160. As discussed above, in FIG. 3, VM 112 and VM 113 are present in host machine 120.

3. Determine Whether Memory Pages are Present in Memory

When a VM is migrated to the target host machine, content from a memory region allocated to the VM in the source host machine may be sent to the target host machine. The target host machine may receive the content and store it to a memory region allocated to the migrated VM in the target host machine.

A VM may be migrated from the source host machine to the target host machine using different techniques. The following is a description of the migration of VM 113 from the source host machine to the target host machine, with reference to FIGS. 1-3. This description applies as well to a subset of the plurality of VMs sharing a memory (e.g., VM 112) in relation to the migration of a VM from the source host machine to the target host machine. In an embodiment, while VM 113 is running on host machine 110, content from a first private memory region coupled to host machine 110 is copied to a second private memory region coupled to host machine 120. The first and second private memory regions may be private to VM 113. Detection module 119 may determine whether a threshold amount of content has been copied from the first private memory region to the second private memory region. After the threshold amount of content is copied from the first private memory region to the second private memory region, VM 113 may be migrated to host machine 120. For example, if the threshold amount of content is determined to be copied from the first private memory region to the second private memory region, migration module 118 may stop execution of VM 113 on host machine 110 and migrate VM 113 to host machine 120. Migration module 128 may resume execution of VM 113 on host machine 120 and further enable VM 113 to access shared memory region 160 and the second private memory region. Because the second private memory region is private to VM 113, VM 122 may be unable to access the second private memory region.

When a VM is migrated from the source host machine to the target host machine, not all of the private memory pages may be present in the target host machine before the VM resumes executing. Accordingly, when the VM resumes executing, it may attempt to access a memory page that is private to the VM and that is not yet present in the target host machine.

In an example, with reference to FIG. 2, VM 113 may attempt to access a memory page that is not yet present in the second private memory region. For instance, detection module 129 may detect an attempted access to the second private memory region by VM 113 running on host machine 120 and determine whether the second private memory region includes one or more private memory pages corresponding to the attempted access. If the second private memory region is determined to not include one or more private memory pages corresponding to the attempted access, migration module 128 may stop execution of VM 113 on host machine 120 and request from host machine 110 the one or more private memory pages corresponding to the attempted access. In response to the request, detection module 129 may receive the private memory pages corresponding to the attempted access. After the one or more private memory pages corresponding to the attempted access is received, migration module 128 may resume execution of VM 113 on host machine 120. The trapped access may be executed on host machine 120 using the second private memory region.

Additionally, in another embodiment, while VM 113 is running on host machine 110, content is copied from shared memory region 150 to shared memory region 160. VM 112 and VM 113 may share shared memory regions 150 and 160. Detection module 119 may determine whether a threshold amount of content has been copied from shared memory region 150 to shared memory region 160. After the threshold amount of content is copied from shared memory region 150 to shared memory region 160, VM 113 may be migrated to host machine 120. For example, if the threshold amount of content is determined to be copied from shared memory region 150 to shared memory region 160, migration module 118 may stop execution of VM 113 on host machine 110 and migrate VM 113 to host machine 120. Migration module 128 may resume execution of VM 113 on host machine 120 and further enable VM 113 to access shared memory region 160.

When a VM is migrated from the source host machine to the target host machine, not all of the shared memory pages may be present in the target host machine before the VM resumes executing. Accordingly, when the VM resumes executing, it may attempt to access a shared memory page that is not yet present in the target host machine. The shared memory region may include memory pages mapped to VMs that share the shared memory region.

In an example, with reference to FIG. 2, VM 113 may attempt to access a memory page that is not yet present in shared memory region 160. For instance, detection module 129 may detect an attempted access to shared memory region 160 by VM 113 running on host machine 120 and determine whether shared memory region 160 includes one or more private memory pages corresponding to the attempted access. If shared memory region 160 is determined not include one or more shared memory pages corresponding to the attempted access, migration module 128 may stop execution of VM 113 on host machine 120 and request from host machine 110 the one or more shared memory pages corresponding to the attempted access. In response to the request, detection module 129 may receive the shard memory pages corresponding to the attempted access. After the one or more shared memory pages corresponding to the attempted access are received, migration module 128 may resume execution of VM 113 on host machine 120. The trapped access may be executed on host machine 120 using shared memory region 160.

The threshold amount of content may be determined in various ways. In an example, the threshold amount of content is based on an estimated downtime of the VM. The downtime may be a time period between stopping the execution of the VM on the source host machine and resuming execution of the VM on the target host machine. In another example, the threshold amount of content is set by a user.

As discussed above and further emphasized here, FIGS. 1-3 are merely examples, which should not unduly limit the scope of the claims. For example, although block diagram 100 is described herein with reference to host machine 110 running three VMs and migrating two VMs, other examples are within the spirit and scope of the disclosure. For example, host machine 110 may migrate more than two VMs without departing from the spirit and scope of the disclosure and two or more VMs may share shared memory region 150.

Further, it should be understood that one or more modules (e.g., migration module 118, detection module 119, migration module 128, detection module 129, identification module 132, target module 134, and allocation module 136) in FIGS. 1-3 may be combined with another module. In an example, at least one of identification module 132, target module 134, and allocation module 136 are combined into one module. In another example, migration modules 118 and 128 may be combined into one module. It should also be understood that one or more modules in FIGS. 1-3 (e.g., migration module 118, detection module 119, migration module 128, detection module 129, identification module 132, target module 134, and allocation module 136) may be separated into more than one module. In an example, migration module 118 is split into a first migration module and a second migration module.

Moreover, a VM running on the source host machine may be migrated to the target host machine using, for example, a network or a storage device.

Additionally, each of the components (e.g., migration module 118, detection module 119, migration module 128, detection module 129, identification module 132, target module 134, and allocation module 136) may reside in a machine different from that shown in FIG. 1. For example, identification module 132 may reside in host machine 110 and migration manager 130 may query host machine 110 to identify a plurality of VMs running on host machine 110, where the plurality of VMs includes a VMs share a shared memory region coupled to host machine 110. Further, migration module 118 and migration 128 may reside in migration manager 130.

III. Another Example System Architecture

Further, FIG. 1 is an illustration of an embodiment in which the source host machine is different from the target host machine. In another embodiment, the target host machine may be the same as the source host machine. For example, VMs 112 and 113 may reside in a first logical partition of the source host machine and are separately migrated to another logical partition within the same host machine.

FIG. 4 is a simplified block diagram 400 illustrating another system for migration of a VM sharing a memory region with another VM, according to an embodiment.

In diagram 400, host machine 110 may be logically divided into one or more different logical partitions that share the host machine's resources (e.g., processors, network cards, and memory). Each logical partition may be allocated specific resources of the host machine or a share of the total resources of the host machine. A separate hypervisor may be loaded into each logical partition to form multiple VMs in each logical partition. Each such VM may be a virtual sharing of the resources allocated to its logical partition.

Host machine 110 includes a logical partition 402 and a logical partition 404 and is coupled to memory 117. Logical partition 402 includes VMs 112, 113, and 114, and hypervisor 116. Hypervisor 116 includes migration module 118 and detection module 119. Logical partition 404 includes VM 122 and hypervisor 126. Hypervisor 126 includes migration module 128 and detection module 129.

In the embodiment of FIG. 4, migration modules 118 and 128 may migrate VMs 112 and VM 113 from logical partition 402 to logical partition 404. In another example, the state of the VM may be saved to a storage device (e.g., file) and then sent to the same hypervisor to be restored.

IV. Example Method

Figure 5:
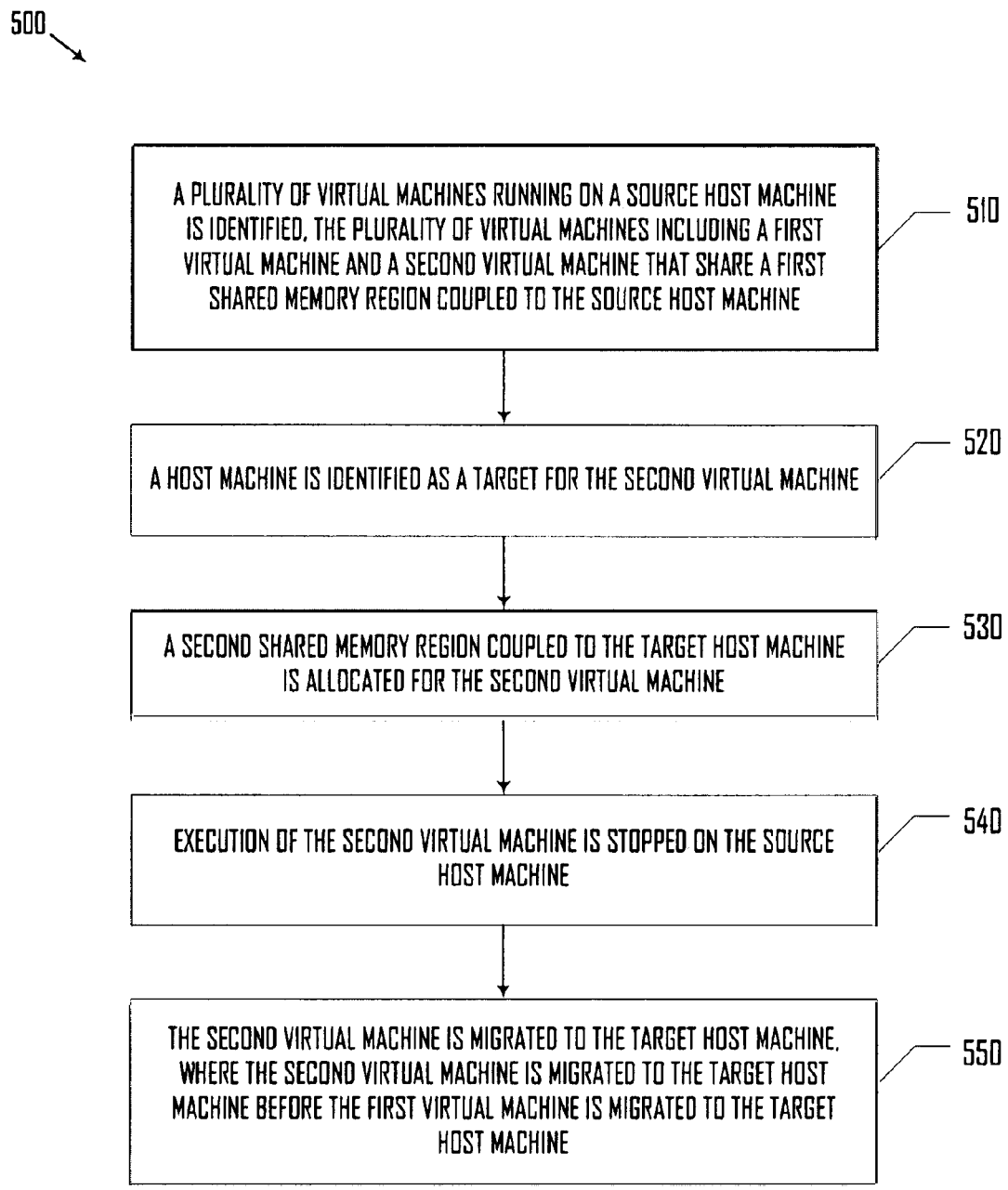
FIG. 5 is a simplified flowchart illustrating a method of migration of a virtual machine sharing a memory region with another virtual machine, according to an embodiment.

FIG. 5 is a simplified flowchart illustrating a method 500 of migration of a VM sharing a memory region with another VM, according to an embodiment. Method 500 is not meant to be limiting and may be used in other applications Method 500 includes steps 510-550. In a step 510, a plurality of virtual machines running on a source host machine is identified, where the plurality of virtual machines includes a first virtual machine and a second virtual machine that share a first shared memory region coupled to the source host machine. In an example, identification module 132 identifies a plurality of virtual machines running on a source host machine, where the plurality of virtual machines includes a first virtual machine and a second virtual machine that share a first shared memory region coupled to the source host machine.

In a step 520, a host machine is identified as a target for the second virtual machine. In an example, target module 143 identifies a host machine as a target for the second virtual machine.

In a step 530, a second shared memory region coupled to the target host machine is allocated for the second virtual machine. In an example, allocation module 136 allocates a second shared memory region coupled to the target host machine for the second virtual machine.

In a step 540, execution of the second virtual machine on the source host machine is stopped. In an example, migration module 118 stops execution of the second virtual machine on the source host machine.

In a step 550, the second virtual machine is migrated to the target host machine, a time period in which the first virtual machine is running on the source host machine overlapping with a time period in which the second virtual machine is running on the target host machine. In an example, migration modules 118 and 128 migrate the second virtual machine to the target host machine, a time period in which the first virtual machine is running on the source host machine overlapping with a time period in which the second virtual machine is running on the target host machine.

It is also understood that additional method steps may be performed before, during, or after steps 510-550 discussed above. It is also understood that one or more of the steps of method 500 described herein may be omitted, combined, or performed in a different sequence as desired.

V. Example Computing System

Figure 6:
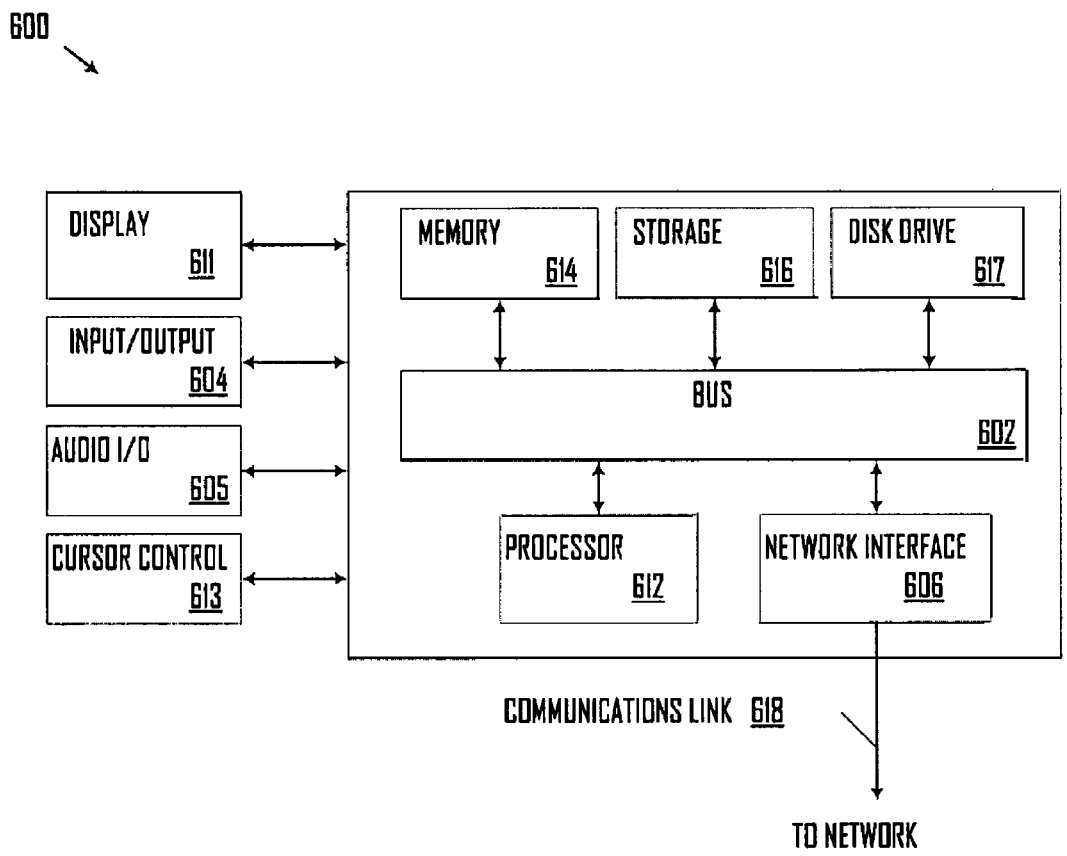
FIG. 6 is a block diagram of an electronic system suitable for implementing one or more embodiments of the present disclosure.

FIG. 6 is a block diagram of a computer system 600 suitable for implementing one or more embodiments of the present disclosure. In various implementations, host machine 110 may include a client or a server computing device. The client or server computing device may include one or more processors. The client or server computing device may additionally include one or more storage devices each selected from a group consisting of floppy disk, flexible disk, hard disk, magnetic tape, any other magnetic medium, CD-ROM, any other optical medium, RAM, PROM, EPROM, FLASH-EPROM, any other memory chip or cartridge, and/or any other medium from which a processor or computer is adapted to read. The one or more storage devices may include stored information that may be made available to one or more computing devices and/or computer programs (e.g., clients) coupled to the client or server using a computer network (not shown). The computer network may be any type of network including a LAN, a WAN, an intranet, the Internet, a cloud, and/or any combination of networks thereof that is capable of interconnecting computing devices and/or computer programs in the system.

Computer system 600 includes a bus 602 or other communication mechanism for communicating information data, signals, and information between various components of computer system 600. Components include an input/output (I/O) component 604 that processes a user action, such as selecting keys from a keypad/keyboard, selecting one or more buttons or links, etc., and sends a corresponding signal to bus 602. I/O component 604 may also include an output component such as a display 611, and an input control such as a cursor control 613 (such as a keyboard, keypad, mouse, etc.). An optional audio input/output component 605 may also be included to allow a user to use voice for inputting information by converting audio signals into information signals. Audio I/O component 605 may allow the user to hear audio. A transceiver or network interface 606 transmits and receives signals between computer system 600 and other devices via a communication link 618 to a network. In an embodiment, the transmission is wireless, although other transmission mediums and methods may also be suitable. A processor 612, which may be a micro-controller, digital signal processor (DSP), or other processing component, processes these various signals, such as for display on computer system 600 or transmission to other devices via communication link 618. Processor 612 may also control transmission of information, such as cookies or IP addresses, to other devices.

Components of computer system 600 also include a system memory component 614 (e.g., RAM), a static storage component 616 (e.g., ROM), and/or a disk drive 617. Computer system 600 performs specific operations by processor 612 and other components by executing one or more sequences of instructions contained in system memory component 614. Logic may be encoded in a computer readable medium, which may refer to any medium that participates in providing instructions to processor 612 for execution. Such a medium may take many forms, including but not limited to, non-volatile media, volatile media, and transmission media. In various implementations, non-volatile media includes optical, or magnetic disks, or solid-state drives, volatile media includes dynamic memory, such as system memory component 614, and transmission media includes coaxial cables, copper wire, and fiber optics, including wires that include bus 602. In an embodiment, the logic is encoded in non-transitory computer readable medium. In an example, transmission media may take the form of acoustic or light waves, such as those generated during radio wave, optical, and infrared data communications.

Some common forms of computer readable media include, for example, floppy disk, flexible disk, hard disk, magnetic tape, any other magnetic medium, CD-ROM, any other optical medium, punch cards, paper tape, any other physical medium with patterns of holes, RAM, PROM, EEPROM, FLASH-EEPROM, any other memory chip or cartridge, or any other medium from which a computer is adapted to read.

In various embodiments of the present disclosure, execution of instruction sequences to practice the present disclosure may be performed by computer system 600. In various other embodiments of the present disclosure, a plurality of computer systems 600 coupled by communication link 618 to the network (e.g., such as a LAN, WLAN, PTSN, and/or various other wired or wireless networks, including telecommunications, mobile, and cellular phone networks) may perform instruction sequences to practice the present disclosure in coordination with one another.

Where applicable, various embodiments provided by the present disclosure may be implemented using hardware, software, or combinations of hardware and software. Also where applicable, the various hardware components and/or software components set forth herein may be combined into composite components including software, hardware, and/or both without departing from the spirit of the present disclosure. Where applicable, the various hardware components and/or software components set forth herein may be separated into sub-components including software, hardware, or both without departing from the spirit of the present disclosure. In addition, where applicable, it is contemplated that software components may be implemented as hardware components, and vice-versa.

Application software in accordance with the present disclosure may be stored on one or more computer readable mediums. It is also contemplated that the application software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Changes may be made in form and detail without departing from the scope of the present disclosure. Thus, the present disclosure is limited only by the claims.

What is claimed is:

1. A system including one or more processors for migration of a virtual machine sharing a memory region with another virtual machine, the system comprising:
   an identification module, executed by the one or more processors, to identify a plurality of virtual machines running on a source host machine, wherein the plurality of virtual machines includes a first virtual machine and a second virtual machine that share a first shared memory region coupled to the source host machine;
   a target module that identifies a host machine as a target for the second virtual machine;
   an allocation module that allocates a second shared memory region coupled to the target host machine for the second virtual machine; and
   a migration module that stops execution of the second virtual machine on the source host machine and migrates the second virtual machine to the target host machine, wherein a time period in which the first virtual machine is running on the source host machine overlaps with a time period in which the second virtual machine is running on the target host machine.

2. The system of claim 1, wherein the second virtual machine has access to a first private memory region coupled to the source host machine, and wherein the allocation module allocates for the second virtual machine a second private memory region coupled to the target host machine, the system further comprising:
- a second migration module that copies content from the first private memory region to the second private memory region, wherein the first and second private memory regions are private to the second virtual machine; and
- a third migration module that enables the second virtual machine to access the second private memory region and resumes execution of the second virtual machine on the target host machine.

3. The system of claim 1, further comprising:
- a second migration module that enables the second virtual machine to access the second shared memory region and resumes execution of the second virtual machine on the target host machine;
- a detection module that, after the second virtual machine has been migrated to the target host machine, detects an attempted access to the first shared memory region by the first virtual machine running on the source host machine;
- a third migration module that, in response to the detection, stops execution of the first virtual machine on the source host machine, traps the attempted access, and migrates the first virtual machine to the target host machine.

4. The system of claim 3, wherein the third migration module sends the trapped access to the target host machine for execution on the target host machine and copies content from the first shared memory region to the second shared memory region.

5. The system of claim 4, wherein in response to the detection, the third migration module sends a communication to the target host machine that causes the target host machine to stop execution of the second virtual machine on the target host machine, and in response to the first virtual machine resuming execution on the target host machine, the fifth migration module resumes execution of the second virtual machine on the target host machine.

6. The system of claim 3, further comprising:
- a fifth migration module that receives the trapped access, resumes execution of the first virtual machine on the target host machine, and enables the first virtual machine to access the second shared memory region, wherein the trapped access is executed on the target host machine using the second shared memory region.

7. The system of claim 1, further comprising:
- a second migration module that resumes execution of the second virtual machine on the target host machine and enables the second virtual machine to access the second shared memory region; and
- a detection module that detects an attempted access to the second shared memory region by the second virtual machine running on the target host machine,
- wherein in response to the detection, the second migration module stops execution of the second virtual machine on the target host machine and traps the attempted access.

8. The system of claim 7, further comprising:
- a third migration module that stops execution of the first virtual machine on the source host machine and migrates the first virtual machine to the target host machine,
- wherein in response to the first virtual machine migrating to the target host machine, the second migration module resumes execution of the second virtual machine on the target host machine, and
- wherein the trapped access is executed on the target host machine using the second shared memory region.

9. The system of claim 1, further comprising:
- a second migration module that stops execution of the first virtual machine on the source host machine, migrates the first virtual machine to the target host machine, enables the first virtual machine to access the second shared memory region, and resumes execution of the first virtual machine on the target host machine;
- a detection module that detects an attempted access to the second shared memory region by the first virtual machine running on the target host machine and determines whether the second shared memory region includes memory pages corresponding to the attempted access; and
- a third migration module that, if the second shared memory region is determined to not include the memory pages corresponding to the attempted access, stops execution of the first virtual machine on the target host machine and requests from the source host machine the memory pages corresponding to the attempted access.

10. The system of claim 9, wherein the detection module receives the memory pages corresponding to the attempted access, and after the memory pages corresponding to the attempted access are received, the second migration module resumes execution of the first virtual machine on the target host machine, wherein the trapped access is executed on the target host machine using the second shared memory region.

11. A method of migration of a virtual machine sharing a memory region with another virtual machine, the method comprising:
- identifying a plurality of virtual machines running on a source host machine, the plurality of virtual machines including a first virtual machine and a second virtual machine that share a first shared memory region coupled to the source host machine;
- identifying a host machine as a target for the second virtual machine;
- allocating a second shared memory region coupled to the target host machine for the second virtual machine;
- stopping execution of the second virtual machine on the source host machine; and
- migrating the second virtual machine to the target host machine, a time period in which the first virtual machine is running on the source host machine overlapping with a time period in which the second virtual machine is running on the target host machine.

12. The method of claim 11, further comprising:
- while the first virtual machine is running on the source host machine, copying content from a first private memory region coupled to the source host machine to a second private memory region coupled to the target host machine, the first and second private memory regions being private to the first virtual machine;
- determining whether a threshold amount of content has been copied from the first private memory region to the second private memory region; and
- if a threshold amount of content is determined to be copied from the first private memory region to the second private memory region, stopping execution of the first virtual machine on the source host machine;
- after the stopping, resuming execution of the first virtual machine on the target host machine; and
- enabling the first virtual machine to access the second shared memory region and the second private memory region, wherein the second virtual machine is unable to access the second private memory region.

13. The method of claim 12, wherein the threshold amount of content is based on an estimated downtime of the first virtual machine, the downtime being a time period between stopping the execution of the first virtual machine on the source host machine and resuming execution of the first virtual machine on the target host machine.

14. The method of claim 12, wherein the threshold amount of content is set by a user.

15. The method of claim 11, further comprising:
after the migrating the second virtual machine, detecting an attempted access to the first shared memory region by the first virtual machine running on the source host machine; and
in response to the detecting:
stopping execution of the first virtual machine on the source host machine;
trapping the attempted access; and
migrating the first virtual machine to the target host machine, wherein the migrating includes sending the trapped access to the target host machine for execution on the target host machine.

16. The method of claim 15, further comprising:
receiving the trapped access;
copying content from the first shared memory region to the second shared memory region;
resuming execution of the first virtual machine on the target host machine;
enabling the first virtual machine to access the second shared memory region; and
executing the trapped access on the target host machine using the second shared memory region.

17. The method of claim 11, further comprising:
detecting an attempted access to the second shared memory region by the second virtual machine running on the target host machine;
in response to the detecting, stopping execution of the second virtual machine on the target host machine; and
trapping the attempted access.

18. The method of claim 17, further comprising:
stopping execution of the first virtual machine on the source host machine;
migrating the first virtual machine to the target host machine;
receiving an indication that the first virtual machine has completed migration to the target host machine;
in response to the received indication, resuming execution of the second virtual machine on the target host machine; and
executing the trapped access on the target host machine using the second shared memory region.

19. A non-transitory machine-readable medium comprising a first plurality of machine-readable instructions that when executed by one or more processors causes the one or more processors to perform a method comprising:
identifying a plurality of virtual machines running on a source host machine, the plurality of virtual machines including a first virtual machine and a second virtual machine that share a first shared memory region coupled to the source host machine;
identifying a host machine as a target for the second virtual machine;
allocating a second shared memory region coupled to the target host machine for the second virtual machine;
stopping execution of the second virtual machine on the source host machine; and
migrating the second virtual machine to the target host machine, wherein a time period in which the first virtual machine is running on the source host machine overlaps with a time period in which the second virtual machine is running on the target host machine.

20. The non-transitory machine-readable medium of claim 19, further comprising a second plurality of machine-readable instructions that when executed by one or more processors causes the one or more processors to perform a method comprising:
copying content from the first shared memory region to the second shared memory region; and
resuming execution of the second virtual machine on the target host machine.

* * * * *